United States Patent [19]

Labarre et al.

[11] Patent Number: 4,717,096

[45] Date of Patent: Jan. 5, 1988

[54] PROCESS AND DEVICE FOR OPENING AN INFLATABLE STRUCTURE CONTAINER, ESPECIALLY SUCH AS A CHUTE FOR CLEARING A PLANE

[75] Inventors: Michel Labarre, Vincennes; Gilles Debray, Paris; Jean Cantelaube, Les Clayes-sous-Bois, all of France

[73] Assignee: Aerazur EFA S.A., Issy-les-Moulineaux, France

[21] Appl. No.: 874,998

[22] Filed: Jun. 16, 1986

[30] Foreign Application Priority Data

Jun. 17, 1985 [FR] France .................. 85 09149

[51] Int. Cl.⁴ ................................. B64D 25/14
[52] U.S. Cl. .................... 244/137.2; 244/147;
244/905; 89/1.14; 114/375; 441/42
[58] Field of Search ............ 244/147, DIG. 2, 137 P, 244/146, 33; 114/375, 367; 102/378; 89/1.14; 441/42, 40, 2, 7–10; 280/743, 731, 732, 738; 52/2

[56] References Cited

U.S. PATENT DOCUMENTS

| 2,689,697 | 9/1954 | Stanley | 89/1.14 |
| 2,937,830 | 5/1960 | Fulton | 89/1.14 |
| 3,138,348 | 6/1964 | Stahmer | 244/146 |
| 3,139,031 | 6/1964 | Schroter et al. | 102/378 |
| 3,454,245 | 7/1969 | Burkdoll et al. | 244/137 P |
| 3,463,915 | 8/1969 | Day | 193/25 B |
| 4,536,008 | 8/1985 | Brown, Jr. | 280/743 |

Primary Examiner—Galen Barefoot
Attorney, Agent, or Firm—Cushman, Darby & Cushman

[57] ABSTRACT

An inflatable system for opening a door of a container in which is located an inflatable shoot includes a retaining member connecting a door for the container to a portion of the wall structure of the container with the retaining portion including a breakable section which houses an explosive device which is exploded upon supplying of fluid under pressure to the container system.

7 Claims, 3 Drawing Figures

PROCESS AND DEVICE FOR OPENING AN INFLATABLE STRUCTURE CONTAINER, ESPECIALLY SUCH AS A CHUTE FOR CLEARING A PLANE

BACKGROUND OF THE INVENTION

This invention relates to a process and a device for opening a container of an inflatable structure, specially such as a chute for clearing a plane and others similar systems (pneumatic boat, shock proof cushions, and the like). For clearness purposes, the following description refers to a plane chute. However, it should be understood that the principle, and the means, together with both the general means and the particular means can be used for other applications.

Numerous container designs adapted to chutes used in the commercial air traffic are already known which meet the aeronautic safety requirements.

Containers integrated into the Karman wing unit, where the plane wing and fuselage intersect, provide a housing, the opening of which is obtained by outwardly rotating a door which, in the closed condition, should be locked so as to prevent any inadvervent unlocking thereof. When using the chute, the controlled opening of the door should be carried out with a high fiability level.

Usually, and until today, such a closing/opening of this form of container is ensured by a line of series mechanical locks.

Such a technology has a disadvantage in that the locks show a functional mobility, i.e. :

The translation thereof, controlled either in a mechanical way or in an electrical way requires implementing specific devices at the cost of the equipment mass and economic balances.

The potential movement thereof, as a result of random external causes, may bring about inadvertent unlocking, thereby palliative members should be provided which unfavourably affect the above-mentioned balances.

SUMMARY OF THE INVENTION

The object of the present invention is to avoid all the forecited constraints by ensuring in an easy manner and with a high fiability level:

an absolute locking of the contaienr closing door, and the instantaneous opening thereof within a step integrated in the chute inflating sequence.

According to the present invention, a process for releasing an inflatable system, including an inflating fluid source, generally a compressed air cylinder, is characterized in that said cylinder opening is controlled so as to supply the chute structure with pressurized gas, and in that this pressurized gas is used for controlling a relay, for actuating a pyrotechnic member, the implementing of which breaks maintaining means which hold the container door of said chute before inflating the latter starts.

So, the door closing the chute container is maintained in the closed state by breakable means (parts to be broken) which can be provided with a higher strength than is necessary to keep the door in the closed state during normal operation. On the other hand, in an emergency, a pyrotechnic member can provide a breaking effort having as high a level as necessary to break the maintaining means without delay and with no failure risk.

The inventive device, for implementing the above-mentioned process, including a duct for supplying the inflatable system with pressurized fluid, is characterized in that a by-pass is provided on said duct, said by-pass being connected to a pneumatically controlled striker, said striker controlling a pyrotechnic member firing arranged in such a way that the implementing thereof breaks said maintaining means holding the door of the inflatable system container.

According to the invention, the pyrotechnic member includes a tube filled with a powder or the like, at least some regions of which are flattened. Such a member does not belong to the present invention scope.

Powder exploding results in said flattened regions expanding, this expanding action serving as a means for breaking the maintaining means holding the door of the inflatable system container.

According to another feature of the invention, said maintaining means include at least an element, called "a part to be broken", this part including a section portion, conformed so as to locate a breakage therein. More particularly, this portion can include a groove, the bottom of which has the form of an angle (dihedron). Advantageously, a second groove can be provided near the first one in order to help distort the part to be broken next to the breakage region.

DESCRIPTION OF THE DRAWINGS

The invention will be readily understood by the following description, in conjunction with the accompanying drawings, in which.

DESCRIPTION OF THE PREFERRED EMBODIMENTS

Figure 1:
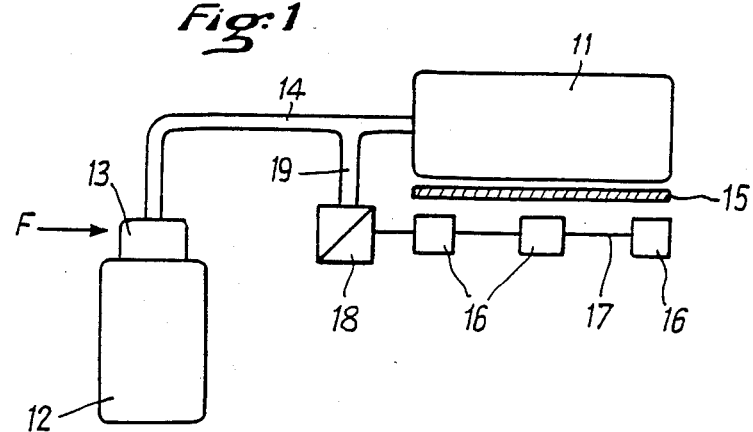
FIG. 1 is a diagrammatic view showing a device according to the present invention.

As schematically shown in FIG. 1, the inventive device includes an inflatable system such as a chute 11 for emergency clearing a plane, a pressurized gas cylinder 122 for inflating said chute, comprising a cock 13, and a duct 14 which connects cylinder 12 to chute 11. Opening cock 13 simply results in chute 11 being inflated, so long as the latter can spread. Reference 15 illustrates the door of a container enclosing the folded chute, said door being maintained in a closed condition through parts 16, said parts being called "parts to be broken", and which will be described in detail hereafter. Part 16 breakage allows door 15 to be opened, thereby chute 11 can get out, spread and be inflated.

As already mentioned, it is obvious that the present invention can be used in others applications, such as in an inflatable lifeboat, a shock proof cushion for motorcars and the like. The involved adaptations are simple and will be obvious for those skilled in the art should such an adaptation have to be carried out. According to the present invention, parts to be broken 16 are placed on a tube or cord 17 filled with powder or otherwise similar firing lanyard. The powder can be fired through a squib placed inside a relay 18. Said squib is struck by a striker actuated by a fluid pressure supplied to said relay. To this end, a by-pass 19 connecting relay 18 to duct 14 is provided.

The process of the present invention includes the following steps. When releasing and inflating chute 11 is desired, compressed air cylinder 12 is opened by actuating cock 13, as shown by arrow "F". Compressed gas expands inside duct 14 towards chute 11 and, through by-pass 19, to relay 18. Said striker is pressure actuated, the latter being, for example, set by an adjustable shear pin. Therefore, the powder is fired. In cord 17, a shock wave is propagated which causes the section thereof to be modified, thereby fracturing part to be broken 16, and this occurs before chute 11 starts being inflated. Therefore, door 15 is no longer maintained. Then, chute 11 is allowed to expand, thanks to the filling gas pressure, and so to be inflated without any obstruction.

Figure 2:
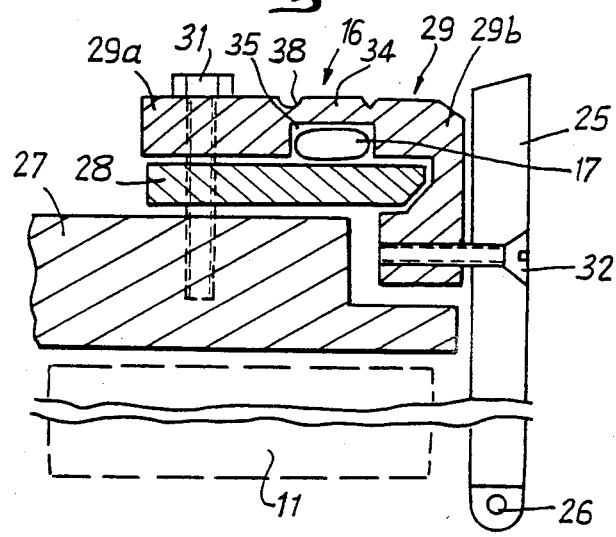
FIG. 2 is a schematic sectional view of an embodiment of means for holding the door of an inflatable system container.
Figure 3:
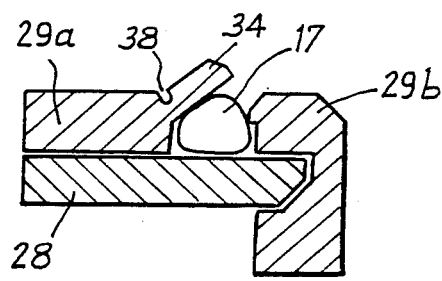
FIG. 3 is side view showing an element illustrated in FIG. 2 after the inventive process has been implemented.

FIG. 2 and 3 illustrate in detail an embodiment of a portion of the invention. Chute 11 is placed inside a container sealed by a dooor 25 which pivots at the lower part thereof, at 26. Door upper part is compressed against container structure 27 and is held in such a closed condition by one or several parts to be broken (three parts are illustrated in FIG. 1, but this number should not be considered as limiting the invention). Advantageously, part 16 includes two elements : a protection and sealing plate 28 and a spacer 29 comprising two protruding portions set apart by a breakable region : a first protruding portion 29a integral with container structure 27, for example through at least one bolt, and a second protruding portion 29b integral with container door 25, for example through at least a screw 32. In this way, when spacer 29 is not broken, door 25 is integral with structure 27 and cannot be opened.

Breakable region can include a thinned portion wherein is provided a groove 33 with an angular bottom (for example, a dihedron of 45-90° ). This thinned portion forms a bridge 34, a face of which is delimited by plate 28. Inside the so-formed groove is provided a cord 17 including a flattened section tube (at least in the portion thereof passing through part to be broken 16) which is filled with powder. Using such an expansion tube is a known process. Plate 28 function is to seal groove 33, and to protect structure 27. In fact, spacer 29 could be applied directly against structure 27, but said structure could be affected by the device working. Angular bottom groove 33 is preferably provided at one end of bridge 34 and a less deep, rounded bottom groove 38 is disposed at the other end 35 of bridge 35. In such a way, when powder explodes inside tube 17 and the latter swells or at least becomes rounded, bridge 34 breaks past groove 33 and flexes around groove 38, as shown in FIG. 3. Bridge 34 remains integral with the whole system and cannot be strongly flung in any direction. Groove 33 is deeper than groove 38, and is angularly shaped in order to undoubtly determine the spot where breakage will occur. Groove 38 functions are to allow bridge 34 to raise and the fractured edges to part, in order to positively disconnect the second protruding portion 29b from the first protruding portion 29a, without both portions running the risk of getting caught after breakage.

As an alternative, for example, a groove with an angular bottom could be provided at the bridge middle and a groove with a rounded bottom at each end.

Bridge 34 thickness between both protruding portions, and groove 33 thickness are selected so as to obtain a tensile strength for spacer 29, from one protruding portion to the other one, sufficient to positively withstand the efforts acting on it during the operating conditions (and which can reach several hundreds deca Newtons). Cord 17 will be selected with a view to obtaining, when fired, the positive breakage and without delay of the so formed bridge.

In the figures, spacer 29 is illustrated with the protruding portion 29b thereof integral with door 25 being turned in below plate 28. This is only for assembly purposes. Other configurations may be used.

Parts to be broken are normally traction biased, and shear broken. They cannot be reduced into small fragments which become true shrapnel shells, so creating a hazard for environment people and equipment.

The pneumatic implementing system is initiated by very high pressures (for example, of about 10 bars) as compared to possible interfering pressures ; this initiating pressure is low with reference to regulated pressure available at the outlet of the compressed gas cylinder (for example, of the order of 30 bars) ; the shear effort produced when pyrotechnic tube expands is much larger than the "parts to be broken" strength; the tensile strength of the parts to be broekn is much larger than the aerodynamic suction efforts applied to the container door ; the whole system is integral, immune from frost and requires no maintenance. A very sound sequence is obtained by using repetitive physical phenomena:

breakage of the striker pin,
propagation of a shock wave (twenty times as much as the sound speed),
flow of gas.

Reasonable variations and modifications which will become apparent to those skilled in the art can be made in this invention without departing from the spirit and scope thereof.

What is claimed is:

1. A process for opening a container for an inflatable member such as a chute for unloading a plane wherein the chute is connected to a source of fluid under pressure through valve means and is housed in a container having a movable door and breakable retaining means holding the door in a closed position, the retaining means being associated with an explosive means actuatable to break the retaining means, comprising the steps of (a) opening the valve means to pass fluid under pressure through a relay to explode the explosive means and thereby break the retaining means, and
(b) inflating the inflatable member with the fluid under pressure.

2. The process of claim 1 including the step of opening the door of the container by inflation of said inflatable member.

3. A device for opening a container for an inflatable member such as a chute for clearing a plane comprising an inflatable member, duct means for supplying a pressurized fluid to said inflatable member, relay means connected to said duct means through a by-pass duct, explosive means disposed in a chamber, a door for the container, breakable retaining means holding said door in a closed position and disposed adjacent said chamber of said explosive means so that, when pressurized fluid is passed through said by-pass duct to said relay to explode said explosive means, said retaining means will be broken to permit said door to said container to open and allow inflation of said inflatable member.

4. The invention as claimed in claim 3 wherein said container includes a wall and said retaining means includes a spacer member having a first portion connected with said wall and a second portion connected with said door and a breakable portion connected to said first and second portions.

5. The invention as claimed in claim 4 wherein said explosive means is a flexible tube containing an explosive and said breakable portion of said retaining means has a reduced thickness relative to said first and second portions to define a groove receiving said tube.

6. The invention as claimed in claim 5 wherein said breakable portion has opposite ends, a shear groove being provided at one of said ends and a bending groove at the other end of said breakable portion.

7. The invention as claimed in claim 5 wherein said first portion of said retaining means overlies a section of said wall of said container and a protection plate is disposed between said first portion and said wall and separates said explosive means from the inflatable member.

* * * * *